April 4, 1939.   R. ERBAN   2,152,796

VARIABLE SPEED TRANSMISSION

Filed March 13, 1935   5 Sheets-Sheet 1

INVENTOR,
Richard Erban,
BY
ATTORNEY.

April 4, 1939.  R. ERBAN  2,152,796
VARIABLE SPEED TRANSMISSION
Filed March 13, 1935  5 Sheets-Sheet 2

Fig. 4

INVENTOR,
Richard Erban,
BY
ATTORNEY.

April 4, 1939.  R. ERBAN  2,152,796

VARIABLE SPEED TRANSMISSION

Filed March 13, 1935  5 Sheets-Sheet 3

INVENTOR,
Richard Erban,
BY
ATTORNEY.

April 4, 1939.  R. ERBAN  2,152,796

VARIABLE SPEED TRANSMISSION

Filed March 13, 1935   5 Sheets-Sheet 5

INVENTOR,
Richard Erban,
BY
ATTORNEY.

Patented Apr. 4, 1939

2,152,796

UNITED STATES PATENT OFFICE 2,152,796

VARIABLE SPEED TRANSMISSION

Richard Erban, New York, N. Y., assignor to Erban Patents Corporation, New York, N. Y., a corporation of New York Application March 13, 1935, Serial No. 10,777

29 Claims. (Cl. 74—208)

This invention relates to power transmission mechanisms of the toric race and roller type and in particular to torque loading systems for use in connection wtih such mechanisms and adapted for generating axial pressure for the purpose of insuring the adhesive contact between the races and rollers, which contact is necessary for the proper functioning of such a system.

In one of its phases my invention deals with the transformation of the effects of torques entering or passing through the toric race and roller system whereby their effects on the system for the purpose of torque loading can be controlled to obtain desired characteristics. These characteristics of my torque-loading system, are the relations between the power transmitted by the transmission and the contact-pressure (or contact load) which will insure positive transmission of power with the highest efficiency at all speed ratios; or, in other words, my torque loader is a structure which avoids overloads in the contact pressure. Overloads not only cause additional losses but also shorten the useful life of the transmission. For transmissions, of the toric race and roller type, it is known that the axial pressure should vary substantially in proportion to the torque transmitted by the roller carrier (or spider), which is also called "reaction torque," in order to get results which are close to the theoretical ideal curve of efficiency. However, on the other hand, if the axial load changes in proportion to the torque transmitted by either one or the other race, a condition results where the system is extremely overloaded at one end or the other of the speed range, thereby limiting severely the power transmitting capacity of the transmission. This can be readily understood if one considers a toric transmission, in which the torque loader is connected to the output race, and, therefore, operated by the output torque. If, with the roller in high speed position, the torque loader develops just the right amount of axial load, then when the roller contact with the race is shifted toward outward positions, the axial load will increase more than is desired or necessary wtih the increasing output torque. If the torque increase is nine fold, the axial load will likewise increase nine fold; but since the roller contact with the race has shifted farther away from the axis, it needs only three time the former pressure for a positive drive. From this, it follows that the roller contact with the race is subject to a pressure three times greater than necessary. This means that the losses are approximately three times as great, and further, that the useful life of the rollers is only 1/27 ($3^3$) of what it could be if the correct amount of load were applied. And in case where there are thrust bearings subject to the axial load, these bearings are likewise subject to this heavy stress and must be dimensioned accordingly. An increase of the dimensions by 44% will be necessary in order to fully compensate for this load, and the transmission will be three times heavier than the one with the correct load characteristic. These conditions may vary somewhat depending on the particular type of transmission.

From another view point this invention relates to reaction torque loading, that is a torque loading system functioning in response to the resultant of the torques passing through the system and generating an axial pressure, for effecting the contact of the races and the rollers, and bearing a predetermined relation to this resultant.

My invention therefore contemplates to use a torque loading device in connection with the races and rollers, and causing a variation of the torque which renders the torque loader effective; such variation being dependent upon changes in the sped ratio of the transmission and following a curve close to the theoretical optimum conditions, as explained hereinbefore. This is generally done by combining several torques to jointly operate the torque-loader, or by splitting a torque into several components, one of which is used to operate the torque loader, alone or in combination with other torques, as the case may be. For securing this result I have shown several systems in which the torques are separated into several components, some of which are transmitted through a lever system in which their characteristics are changed, and after which changes they are reunited and passed through the device for generating axial pressure to be applied at the contact points.

For the attainment of the aforementioned objects and such other objects as will hereinafter appear or be pointed out, I have illustrated several embodiments of my invention in the drawings, in which.

Figure 1:
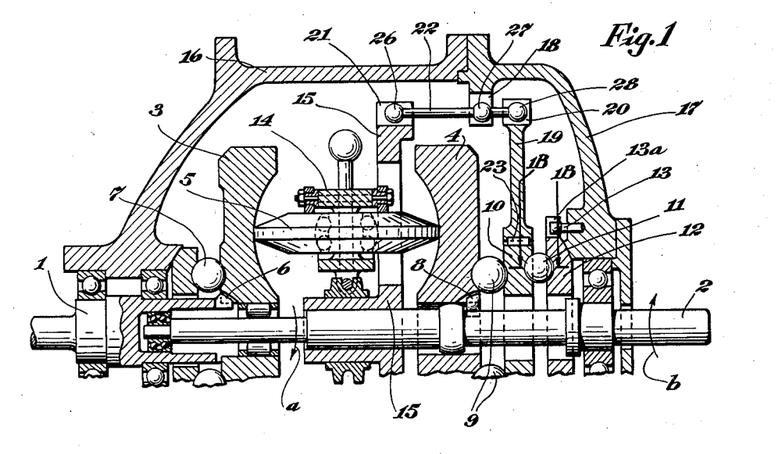
Figure 1 is a central longitudinal sectional view through the form of power transmission system having my invention applied thereto, only the upper half of the system being shown.
Figure 1A:
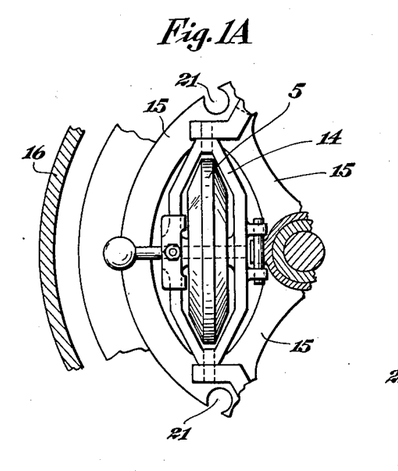
Figure 1A is a detail view of the roller mounting.

In Figure 1 I have attempted to show, by way of example, a toric race power transmission system having a single set of rollers positioned between a pair of races and provided with a spider type of torque loading device. Although either of the two shafts may be the driving shaft and the other respectively the driven shaft, it will facilitate the description if 1 is considered as the driving and 2 as the driven shaft. One of the toric races of the system, is suitably connected with the driving shaft 1, such as by the dog 6. Axial thrusts of the race 3 are taken up by a bearing 7, shown as of the ball bearing type, and transmitted to the supporting frame, shown as a housing 16 surrounding the entire mechanism. The driven race, also of the toric type, is shown at 4, and is connected to the shaft 2 by the keylike element 8, and its axial thrusts are taken up by a bearing shown as comprising a ring 10, disposed around the shaft 2, and provided on one side with an annular groove for the bearing balls 9, and on its other side with torque grooves, that is, short grooves, varying progressively in depth, in which are located pressure balls 11. The torque grooves are illustrated, by way of example, in Figure 1B which is a section taken on line 1B—1B of Figure 1. Complementary torque grooves are provided in the annular torque flange 12, and are disposed around shaft 2. The flange 12 is shown as pivotally mounted in relation to the housing 17, by the provision of a spherical seat in the housing with which a complementary surface on the flange engages, but is held against rotation relative to the housing by a pin 13, shown as provided with a spherical head and passing into the slots 13a of the flange 12. The rollers 5, forming a symmetrically disposed set of which only one is shown in Figure 1, may, for purposes of adjusting the speed ratio, be mounted in pivoted frames 14, shown in further detail in Figure 1A, and carried by the member 15, which will hereafter be referred to as the "spider", and which is mounted so as to be freely rotatable upon the shaft 2, and is provided on its outer rim with slots 21, only one of which, however, is shown in Figure 1.

The aforementioned ring 10 which forms one side of the torque loading device, is shown as mounted within a disc 19 and as suitably connected to it as by key 23. The disc 19 is shown as provided on its outer rim with slots 20 corresponding in number and position to the slots 21 of the carrier 15. The casing or housing 17 has inwardly extending projections, provided with slots 18, which slots are positioned intermediate of and register longitudinally with the slots 20 and 21, aforementioned. A lever 22 is so disposed within each set of registering slots 18, 20 and 21 that it forms an operative flexible connection between the spider 15, the housing 17, and the torque flange 10, and for this purpose spherical enlargements 26, 27 and 28 may be formed in each lever, where it engages the walls of the respective slots. The lever 22 is shown in Figure 1 as a lever of the first class, that is, one that has its fulcrum intermediate its ends, so that its ends will move in opposite directions about the fulcrum, which in this case is at the enlargement 27.

The operation of this mechanism will now be explained. Assuming that shaft 1 is rotating clockwise, when viewed from the left-hand end of the drawing, as indicated by the arrow a, then shaft 2 will rotate in the opposite direction as indicated by the arrow b, that is counterclockwise, and the spider 15, if free to rotate, would rotate clockwise. Since, however, it is held against rotation, it cannot rotate, but the reaction torque of the carrier will still tend to cause it to rotate clockwise, and consequently due to the action of the levers 22, the disc 19, and with it the torque flange 10, will tend to rotate in a direction opposite to that of the spider 15, that is counterclockwise. It is obvious that the peripheral force applied by the end of each lever 22 within each slot 20, is greater than the peripheral force between the other end of the lever and the slot 21, in proportion to the leverage. In other words, since the radii of the points of application of this force in relation to the axis of the system, that is the axis of shaft 2, are equal, for the construction shown in Figure 1, the torque applied to the disc 19 will be increased over the reaction torque of the carrier 15 in the same proportion, that is, in the ratio determined by the levers 22. It may be noted that such an increase in torque can also be obtained, without changing the leverage, by moving the point of application, of the lever in slot 20 radially outward, that is farther away from the axis of the transmission.

Figure 2:
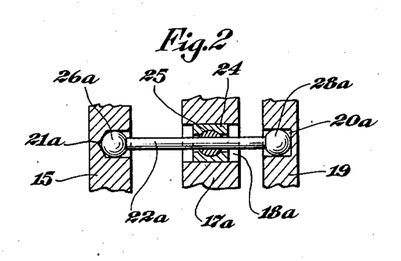
Figure 2 is a detail view of a modification of one of the elements of the construction shown in Figure 1.

The leverage of each lever 22, that is, the ratio between the distances 26—27 and 27—28 may be made variable or adjustable by having the enlargement 27 which forms the fulcrum of the lever 22, slidable in an axial direction, or lengthwise of the lever 22, and such a construction is shown in Figure 2. The lever, as there shown, consists of a cylindrical part 22a with spherical ends 26a and 28a, inserted respectively in slots or cylindrical holes 21a and 20a, while slidably mounted on the cylindrical part 22a is a spherical cushion 25, surrounded, so as to be pivotally movable therein, by a suitably formed block, which in operation is slidable in the slot 18a of an extension of the casing 17a. Controlling movement of the fulcrum 24, 25 can be correlated to the external means for changing the speed ratio of the power transmission, so as to automatically vary the torque loading characteristics in a predetermined relation to the speed ratio.

Figure 3:
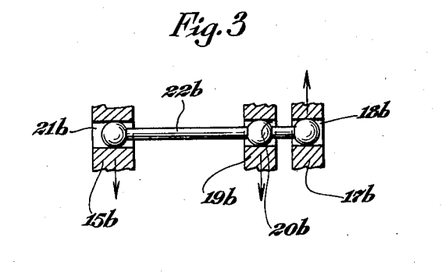
Figure 3 is a view of another modification of a portion of the construction shown in Figure 1.

In Figure 3 a leverage system is shown in which the lever is of the second class, that is, one in which the fulcrum is at one end of the lever, and the load is applied between the fulcrum and the point of application of power. The figure is self-explanatory, similar numerals having been used for the parts as were used for Figure 1, but the letter b has been added to distinguish them. It should however be noted that in this case the disc 19 and the torque flange 10 will move in the same direction as the spider 15. For the same conditions as were shown in Figure 1, that is, where the leverage ratio 18b—21b to 18b—20b is about 2 to 1, the torque upon flange 10 is about twice as great as the reaction torque of the carrier 15b.

A torque loading system such as described, has many advantages, as will now be pointed out. Since the pressure developed between the torque flanges 10, 12 depends, for a given torque, upon the angle of the torque grooves, very small angles for these grooves are necessary if great axial pressure is to be obtained by a relatively small torque. Such small angles, however, result not only in manufacturing difficulties but also give a decreased efficiency of the device in operation. Therefore, from both standpoints, the angles for the torque grooves should be as great as possible, which in turn means that a comparatively great torque has to be applied in order to get a great axial component. The above described system accomplishes the utilization of relatively small reaction torques for the production of large axial pressures, without necessitating torque grooves of small angles.

Another advantage of my system consists in the reduced inertia moment of the torque load system under dynamic conditions. In a system with straight reaction torque loading, that is, one in which the spider 15 is direct connected to the disc 19, the moment of inertia that must be overcome by the traction between race 3 and the rollers 5 comprises the moments of inertia of the spider 15, including that of the rollers 5, and of the disc 19 and the flange 10. This inertia must be overcome before the torque flange 10 can be turned relatively to 12 far enough to set up the necessary additional axial pressure. In the construction of Figure 1 the angular movement of the disc 19 and the flange 10 is only about one half that of the spider 15, so that the moment of inertia of these parts will be reduced by the leverage systems to only one fourth of its former value. This means that less traction force is necessary between race 3 and rollers 5 in order to operate the torque loading device 10, 11, 12.

If a lever of the second class be used, such as shown in Figure 3 at 22b, both of the above advantages would still be present. The design shown in Figure 1, however shows a third advantage over a straight reaction torque loading arrangement, which exists only in a lesser degree in an arrangement such as in Figure 3. It has been shown that the reaction torque of the roller carrier tends to move it in the same direction as the driving shaft, and that the torque flange 10 is positioned between the pressure balls 11 and the thrust bearing 9, which latter runs in an opposite direction to the driving shaft 1. It is obvious that internal friction of the thrust bearing 9 tends to move the torque flange 10 in the same direction as the driven shaft 2, so that, if this flange is so arranged that it turns in the same direction as the shaft 2, such frictional forces exerted upon the flange 10 will increase the useful torque upon this flange, and thereby increase the axial pressure upon the whole system. Such an effect takes place in a construction such as that shown in Figure 1. In a direct or straight reaction torque loading system however, the spider moves the flange 10 in the opposite direction to the shaft 2, and in this case, the frictional forces of the bearing 9 decrease the useful torque transmitted to the flange 10 and therefore also decrease the axial pressure exerted upon the whole system. While under normal conditions the frictional forces of the bearing 9 may be so small as not to interfere with the proper functioning of the transmission, yet the effects thereof may become very serious in the case of a defect in the bearing 9. A loss in the bearing 9 increases the load upon the transmission which must be transmitted from the driving shaft through the rollers and races. There should therefore be a corresponding increase in the axial pressure upon the whole system in order to permit the transmission of the necessary force to overcome such increased loss within the bearing 9. But at the same time the torque corresponding to the frictional losses of bearing 9 acts upon the flange 10 in opposition to the reaction torque transmitted to that flange from the spider 15, so that only the difference of these torques acts upon the balls 11 in the torque grooves to develop a correspondingly decreased axial pressure. In most cases this decreased axial pressure will not be sufficient to maintain adhesive contact between the rollers 5 and the races 3 and 4, and slippage and destruction of the transmission will follow.

In the arrangement of Figure 3 the torque applied to the flange 10 from the spider 15 is in the opposite direction to the friction torque of the bearing 9, and therefore only the difference of the torques is applied to the torque loading device. This is somewhat similar to what take place in a direct torque loading arrangement. However it must be observed that in Figure 3 the torque applied to flange 10 from the roller carrier 15 is considerably increased due to the leverage system, so that a much larger amount of friction can occur in the bearing 9 without causing damage.

Figure 4:
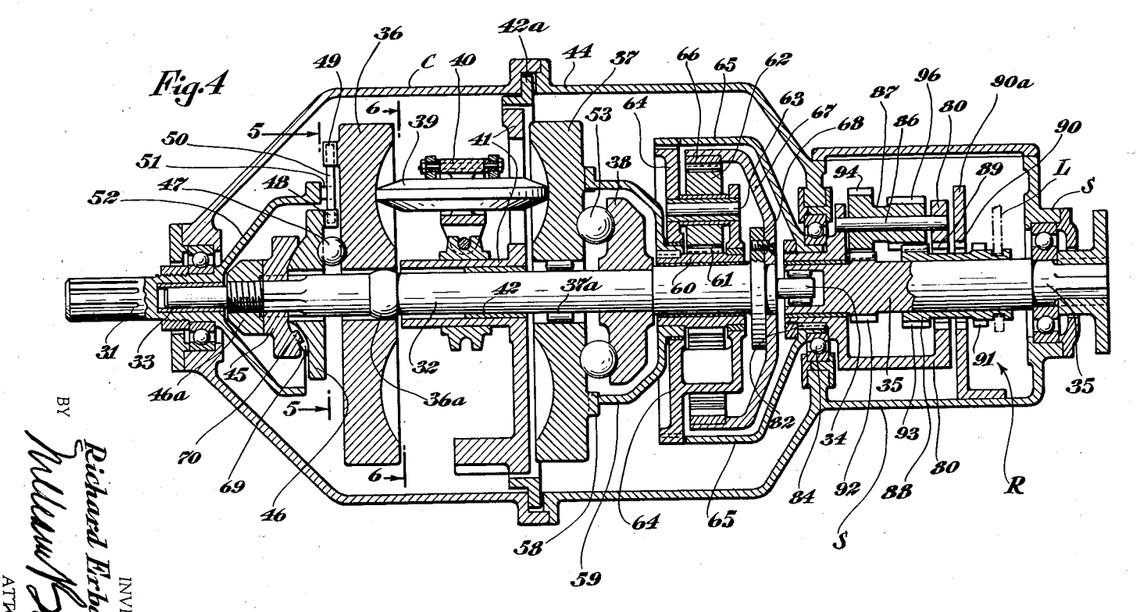
Figure 4 is a central longitudinal sectional view of another form of power transmission system having my invention applied thereto.

Figure 4 shows a toric transmission of the differential type, that is, one in which a planetary differential gear system is associated with the toric race and roller system. It consists, broadly considered, of an outer member in the form of an internal spur gear which transmits the greater part of the power, and a toric variable system in series with the sun gear, which transmits the lesser part of the power.

Figure 5:
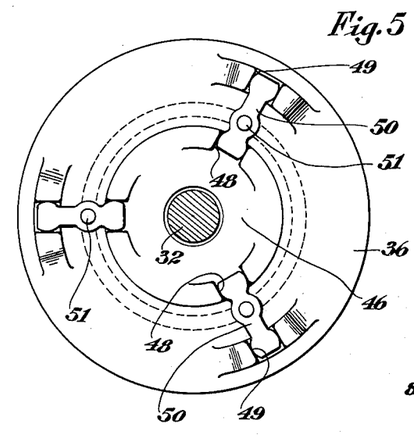
Figure 5 is a sectional view on the line 5—5 of Figure 4 looking in the direction of the arrow, and showing a system of pivoted levers for transmitting torques.
Figures 6, 6B:
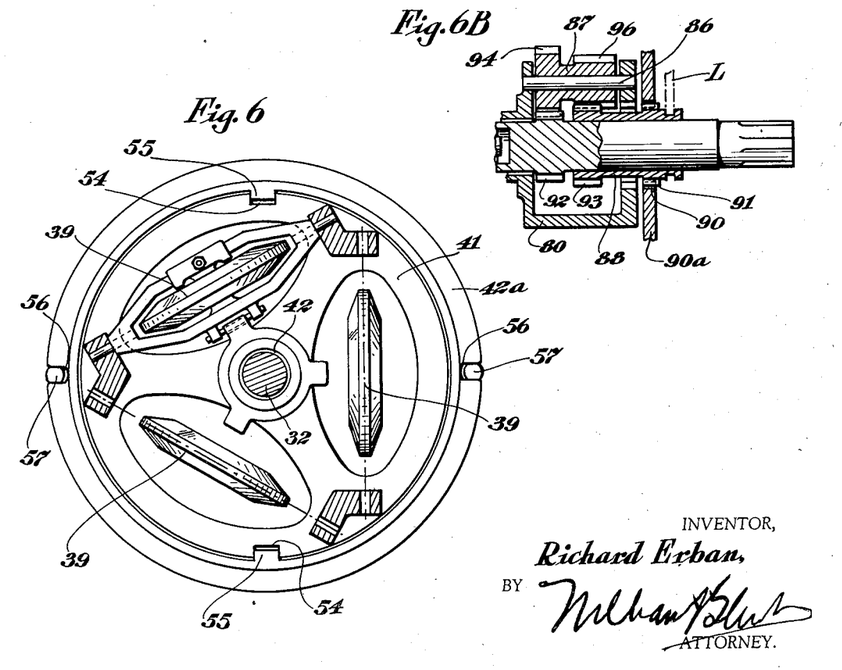
Figure 6 is a sectional view substantially on the line 6—6 of Figure 4, looking in the direction of the arrows, and showing certain details of the roller carriage.
Figures 6A and 6B are views, in section, of the reverse gear of Figure 4 and similar to the showing thereof, but showing the reverse gear in different positions of adjustment.

Referring now in detail to the parts of Figures 4, 5 and 6, it will be observed that two shafts 31 and 35 are there shown in axial alignment. For the sake of simplicity of explanation the shaft 31 will be referred to as the driving shaft, and the shaft 35 as the driven shaft, although it is to be clearly understood that either shaft may function as the driving or as the driven member in relation to the system.

It will further be observed that an intermediate shaft 32, axially aligned with shafts 31 and 35, and having its ends 33 and 34 journalled respectively within hollow portions of the ends of shafts 31 and 35 respectively, is interposed between said shafts and acts as a support for the toric and the differential systems.

A race 36, provided with a toric traction surface, is shown as freely mounted on a spherical enlargement 36a of the shaft 32, so that it may slide and pivot universally in relation thereto. A second race 37, also provided with a toric raceway and complementary to the race 36, is shown as mounted on the rollers 37a surrounding the shaft 32 so that it may turn about shaft 35 and move axially in relation thereto.

Rollers 39, rotatably mounted in frames 40, carried by and tiltable in relation to a carrier 41, of spider form, and which will hereinafter be referred to as the "spider", are positioned between the races and in adhesive driving contact with the toric raceways thereof for purposes of power transmission, all as customary.

The race 36, is in driving relation to the driving shaft 31, although it has limited freedom of movement in relation thereto, as will now be described. A torque flange 46 is mounted on shaft 32 so as to be rotatable therewith, but is at the same time provided with an enlarged bore, permitting lateral and pivotal movement thereof in relation to shaft 32. It is provided with a spherical surface 69 engaging a complementary surface provided on a pressure element 45 keyed to the shaft 32, but slidable in relation thereto. A pin or key 70 carried by element 45 and engaging a groove in flange 46 prevents rotation in relation to 45, without interfering with its pivotal movements. A nut 46a on the shaft 32 provides means for adjusting the position of the element 45 and consequently of the flange 46.

Figure 1B:
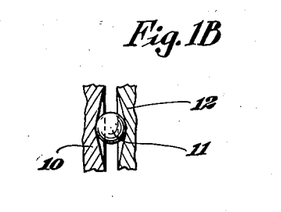
Figure 1B is a detail view in section, taken on the line 1B—1B of Figure 1, looking in the direction of the arrows.

Race 36 and flange 46 are provided with complementary torque grooves, which may be similar to the grooves shown in Figure 1B, in which are disposed the torque loading balls 47, and thereby a driving connection between flange 46 and race 36 is established.

Connection between the driving shaft 31 and the race 36 is established by a system of levers shown in detail in Figure 5, and comprising levers 50 pivotally mounted on pins 51 carried by the drum-like extension 52 provided on the end of shaft 31. The inner ends of levers 50 engage slots 48 provided on flange 46, and the outer ends of the levers similarly engage slots 49 provided on race 36. It will be observed that the ends of the levers are provided with rounded enlargements, which engage the aforementioned slots. It will be apparent from this description that the levers are capable of limited pivotal movement so as to permit relative movement between race 36 and members 52 and 46.

A pressure member 38 carried by shaft 32 and provided with a ball race, coacts with a corresponding groove in race 37 to receive bearing balls 53 and thereby to provide an abutment furnishing the axial reaction pressure when the torque loading ssytem functions, the member 38 being held against axial movement as by a shoulder on shaft 32.

The differential system, which, as has been stated, is of the planetary type, comprises a central or sun gear 60 of spur type, having teeth shown at 61, jounalled on shaft 32 and connected for direct drive to the race 37 by a member 59 keyed to gear 61, and having notches in its periphery to receive lugs 58 provided on race 37. The outer member of the planetary system is constituted by the internal spur gear 66 carried by a member 67 connected for direct drive from shaft 32 as by a flange 68 carried by the end of shaft 32. The planetary gears 62, meshing on their opposite sides respectively with the sun gear 60 and the internal gear 65, are journalled on pins 63 carried by the cage 64 that has a driving connection, through lugs engaging in notches in the cage 64, with a member 65. The latter has a driving connection with a shaft 35 through the intermediary of a reverse gear system, denoted as a whole by the letter R, and which will be described in detail hereinafter.

If in the system shown in Figure 4, we assume that the shaft 31 were directly connected to the shaft 32, and consequently directly connected to the internal gear 66, while the race 36 were coupled only to the shaft 32 through the torque loading device 47—46 (leaving out the levers 50 and fulcrums 51), then it will be found that the torque loading system produces an axial pressure with "output torque-loading characteristic", which has all the serious disadvantages explained earlier in this specification. To arrive at these conclusions, the following reflections will prove helpful: If the ring gear 66 is driven from the shaft 32, and the carrier of the planetary wheels 62 is connected to the driven shaft 35, and if we further assume that the rollers 39 would not exist, then it is apparent that no power can be transmitted from the driving to the driven shaft, unless the sun-gear 60 is prevented from rotating freely. If the sun-gear 60 is stopped from rotation altogether then all of the power of shaft 32 will be transmitted to the shaft 35 (except, of course for friction losses in the gears). If however the sun-gear is not held with sufficient force against rotation, it will spin in a direction of rotation opposite that of the shaft 32. Since the race 37 is directly connected to the sun-gear, it also will have a tendency to rotate in the opposite direction of shaft 32.

If now we assume that the rollers 39 were transmitting movement and power to the race 36, and that the race 36 including the elements 47—46 were free to rotate with respect to the shaft 32, for instance, by removing the key connection 69—70, we find that the race 36 has a tendency to rotate in the same direction as the shaft 32. If we assume that free rotation of the race 36 is now prevented by a brake acting upon the rim of that race, it will be found that such application of the brake will slow down the race 37 as well and also the sun-gear 60, thereby causing the planetary wheels 62 to revolve and to transmit power to the driven shaft 35. The more the sun-gear 60 is slowed down, the greater will be the portion of the power of the shaft 32 that will be transmitted to the shaft 35. That portion of power, which causes the sun-gear to rotate is destroyed by the brake which acts upon the rim of race 36. Now, assumed that the brake is removed from the rim of the race 36, and made to act upon the element 46, it appears that the effect of the brake will be the same as before, as far as the slowing down of the sun-gear is concerned; it further appears that now the power and torque, which tend to make the race 36 and the element 46 rotate against the restraining effect of the brake, have to pass the torque-loader ball 47, thereby generating an axial pressure in proportion to the torque delivered from the race 36 to the element 46 and taken up by the brake. Therefore, since the power enters the toric friction gear system by the race 37, and leaves it by the race 36, the latter is the "out-put race" and the axial pressure generated will follow the "output-torque loading-characteristic" as has been previously explained.

Inspection of Fig. 4 will show that the sun-gear 60 tends to rotate *n*-times faster than the shaft 32, if "*n*" is the ratio between the ring-gear 66 and the sun-gear. It follows therefrom that the race 36 likewise will tend to rotate faster than the shaft 32; and since it is rotating in the same direction as the shaft 32, the slowing down of the race 36 can be accomplished by providing a keyed connection between the element 46 and the shaft 32, as shown in the drawings at 69—70—45. The element 46 is now "held back" against the tendency of the race 36 to rotate faster, and this relative rotation between the race and the element 46 causes the torque-loader balls 47 to generate an axial pressure. The power and torque transmitted from the race 36 to the element 46, which was formerly destroyed by the brake assumed to be acting upon the element 46, is now, with the brake left off, transmitted from 46 to 45 and to the shaft 32, where it unites with the torque coming from the driving shaft 31, and the united torques drive the ring-gear 66.

Tilting the rollers 39 will permit to slow down the sun-gear 60 more or less, thereby also changing the speed of the out-put shaft 35. It is clear, that if the ratio of the variable system is such as to allow the sun-gear to spin three times as fast as the shaft 32, the speed of the driven shaft 35 can be slowed down to zero. It may be well to consider here briefly what happens if the sun-gear would be driven faster than three times the speed of shaft 32. Inspection of the drawings will show that then the planetary wheels 62 will start to revolve around the sun-gear in a direction opposite to that of the ring-gear 66, or, in other words in the same direction that the sun-gear is rotating. Consideration of the fact, that now the sun-gear and the out-put shaft are rotating in the same direction, while the ring-gear is rotating opposite thereto, will disclose that now the sun-gear is the driving part, while the ring-gear is the driven part that carries a split portion of the total power back to the variable system. And since the sun-gear is the driving part, the main power passes from the shaft 31 to shaft 32 (still leaving out the levers 51) and hence through the elements 45—46—47 to the race 36, through the roller 39 to the race 37 and on to the sun-gear 60. The back-feed torque, which now comes from the ring-gear 66, unites in the shaft 32 with the torque of the shaft 31, and these united torques then pass along the way just above described. It is evident that the torque-loading characteristic now obtained will correspond to "input-torque loading", since it is the torque of the race 36, which is now "input race", that is made to operate the torque load device 46—47.

Therefore, in order to obtain one of the objectives of the present invention, that is a characteristic of the axial load which corresponds to the reaction torque of the spider 41, it is necessary to generate the axial pressure by a torque which is equivalent, or in a known proportion, to the sum of the torques of each of the two races, instead of using the entire torque of either one race alone. In order to simplify the following considerations, they will be made for the case in which the sun-gear is "slowed down" in its tendency to rotate faster than the shaft 32, and where the race 36 is therefore the "out-put race" for the back-feed power, although it is to be understood that a similar consideration can be made for the other case.

With race 36 being the out-put race, it is evident that its torque passes through the torque loading device 47—46.

It will now be shown how the torque of the disc 37 is made to pass through the torque loading system 47—46. It will be observed that the torque of the race 37 is always present at the sun wheel 60 of the planetary, and the torque of the internal gear 66 of the planetary is always in a fixed proportion of the torque to the sun wheel 60, this proportion being equal to the ratio of the planetary. It is therefore obvious that the torque in the shaft 32, which is the same as that in the internal gear 66, is always in a fixed proportion to the torque of the race 37. If, therefore, the torque within the shaft 32 were to be made to pass through the torque loading system, the pressure created by this system would be always in a predetermined proportion to the torque of the disc 37. If such pressure is then applied to the race 36 in parallel with the pressure exerted on the race 36 by the balls 47, the total pressure would then correspond to or be proportional to the sum of the torques of the races 36 and 37, which is the task we set out to accomplish.

The torque within the shaft 32 consists, as heretofore shown, of back feed torque of the race 36 plus the torque of the driving shaft 31. Instead of passing this sum of the torques through the torque loading device we can pass its components. The torque of the race 36 has already passed the torque loading device 47. It is now desired to produce an axial pressure in addition to the one already produced at 47, and for this purpose the torque grooves at 47 are made with a smaller angle so as to produce more pressure.

The only problem remaining is to produce an axial pressure bearing a certain proportion to the driving torque of shaft 31. This might be done in a simple way by connecting the drum 52 directly to the race 36, in which case all of the driving torque would pass through the torque loading pressure system 47, along with the torque delivered by the race 36. This, however, would not correspond to a true reaction torque loading characteristics, as that part of the axial pressure developed by the driving shaft 31 would be predominant and the result would be something half-way between reaction torque loading and input torque loading. The reason for this is that the ratio of the planetary gear in the illustrated disclosure is different from one to one. This will be clear if it is remembered that in a one to one position of the rollers of the variable system, as shown in Figure 4, the torques of both races are equal, and therefore each should furnish one half of the necessary axial pressure. This means that, the system 46—47 remaining unchanged, the torque of 37 would have to pass therethrough without being increased or decreased in size.

If therefore we suppose the ratio of the planetary to be one to one, that is, the pitch diameter of 61 equal to the pitch diameter of 66, it then becomes obvious that the torque of 37 will be found in the shaft 32 unchanged as to size but acting in the opposite direction. Therefore in this case we would have to pass the torque of 32 through a torque loading system of the same dimensions as 47—46. It follows from this that for any such ratio of the planetary system 61—66 which is not equal to 1 to 1, the torque transmitted through 66 will be increased as against the torque of the race 37 and therefore only a part of the torque of 32 should be passed through the torque loading device system of the same dimensions as 47. This can be done by splitting the torque of the shaft 31 between the race 36 and the flange 46, and is accomplished in my construction by means of the levers 50, the arrangement of which is clearly disclosed in Figure 5, which shows the torque splitting system as seen from the left-hand side of Figure 4.

The operation of this device will now be described. The torque of shaft 31 is transmitted to the pins 51 and from there one part passes through levers 50, through the flange 46, and the shaft 32 and into the ring gear 66. Another part of the torque of shaft 31 goes from levers 50 through the slots 49, into the disc 36, where it unites with the torque that is delivered to this disc by the rollers 39, and the united torques pass through the torque loading system 47 to the flange 46, and there unite with that part of the driving torque which was delivered directly to the flange 46. The sum of all of these torques then goes to the shaft 32.

A special feature of my invention, useful in connection with the spider 41, so as to permit free adjustment of the spider and to prevent any radial loads between the hub 42 and the shaft 32, may here be referred to. This feature consists in assembling the spider within a loose ring 42a (see Figures 4 and 6), and connecting it with this ring so that it is capable of a slight transverse movement along one diameter; this can be done, for instance, by providing the spider with radial slots 54 which cooperate with projections 55 of the ring 42a. The ring itself is then connected to the housing in a similar manner but so that it can slide transversely, that is, in a direction 90° from the first mentioned sliding movement. The slots 56 of the ring 42a engage with pins 57 of the casing. Only torques and no radial forces can be transmitted between the casing and the spider, and besides that the spider can adjust itself in any direction, within certain limits, within the casing.

Figure 6A:
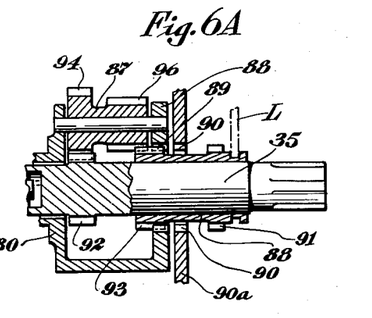

The details of the reverse gear R, heretofore mentioned, may be understood from Figure 4 in connection with Figures 6A and 6B. A stub shaft 35 is carried in an extension S of the transmission casing C, and journalled therein at its exterior end. At its other end it is surrounded by the housing 80, which housing is keyed at 82 to the member 65, and this whole assembly may be journalled in the casing C as indicated at 84. The shaft 35 is shown as hollow at one end, and as having journalled therein the extension 34 of shaft 32. Pins 86 are carried by the housing 80 and thereon are mounted the member 87 carrying two pinions 94, 96, respectively of different diameters. The control member 88 is slidable on the shaft 35 and may be adjusted by any suitable arrangement, whether manual or automatic, indicated symbolically by the letter L. This control member is provided with teeth 93 adapted to engage only the pinion 96 of member 87 or to slide into a position at which it engages both the pinion 96 and teeth 89 formed on the housing 80. Member 88 is also provided with a second set of teeth 91 that are adapted to engage teeth 90 provided on a member 90a fast to the casing S. The shaft 35 carries in driving relation thereto a pinion 92 to mesh with the teeth 94 of member 87.

The operation of this gear will be clear from Figures 6A and 6B, the former representing the forward drive position and the latter the reverse drive position.

Referring first to Figure 6A, it will be observed that the member 88 has been slid into a position in which the member 87 is locked in relation to the housing 80 because of the engagement of the pinion 93 with pinions 96 and teeth 89. It will be obvious that under these conditions the member 87 cannot be rotated in relation to the housing and that therefore as the housing 80 rotates, due to the engagement of pinions 94 and 92, it carries the shaft 35 with it. In other words the whole gear train is locked so as to function as an integral unit.

When it is desired to reverse, the control member 88 is slid to the left, so that the teeth 91 thereof engage the teeth 90 on the housing. In other words the member 88 is held against rotation. As the housing 80 rotates the member 87, which is in engagement with the pinion 93 of member 88, now stationary, is caused to rotate about the pin 86 and, due to the engagement of pinion 94 of the member 87 with the pinion 92 on shaft 35, the latter is forced to rotate in a direction reverse to that of the housing.

Figure 7:
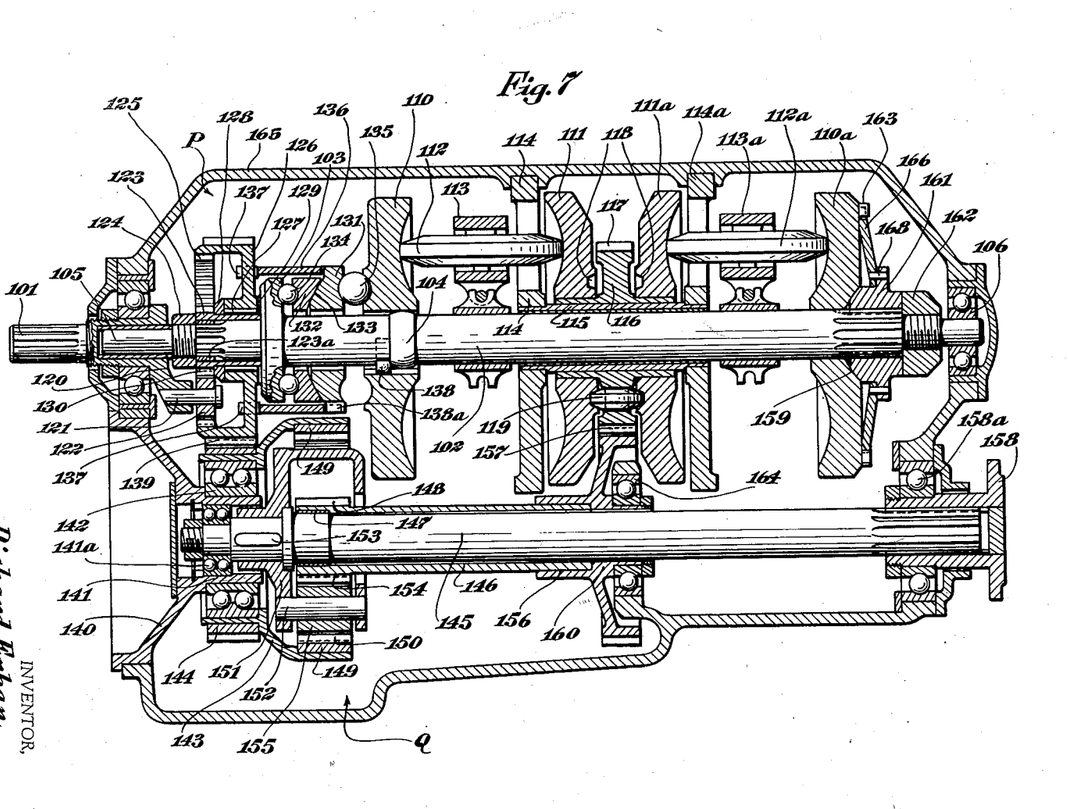
Figure 7 is a central longitudinal view of still another form of power transmission mechanism with my invention embodied therein.

Figure 7 shows a transmission system based upon the same dynamic principle as the transmission in Figure 4. The construction of this figure comprises a double toric variable system, that is, a toric system in which the power is divided into two parts which travel along parallel paths each through a variable toric system, these toric systems being variable similarly and simultaneously. The spur gear planetary system instead of being located on the same shaft as the toric systems is located on a parallel shaft.

Referring now to Figure 7 in detail, the shaft 102 carries the toric system, and the shaft 145 parallel thereto carries the planetary system Q. The shaft 102 is connected through the planetary system P to the shaft 101. For convenience of description this shaft 101 will hereinafter be referred to as the driving shaft, and the shaft 145 as the driven shaft. It is to be understood, however, that the shaft 145 may also function as a driving shaft and the shaft 101 as a driven shaft. Shaft 102 is supported at one end in the bearing 105 provided in the hollow end of shaft 101, and at its other end in the bearing 106 of the casing 166 of the transmission.

Assuming then, for purposes of description, that the shaft 101 is the driving shaft, the races 110 and 110a may be described as the driving races, and the races 111 and 111a as the driven races. Intermediate the races 110 and 111 are located sets of rolling bodies 112 similar to those of Figures 1 and 4, journalled for rotation in the frames 113, tiltable for purposes of varying the speed ratio, as are the frames 14 of Figures 1 and 1A and mounted in a carrier 114. This latter will hereinafter be referred to as the spider. A similar system of rollers 112a between races 110a and 111a, and carried by adjustable frames 113a, is mounted on the spider 114a. The driven races 111 and 111a are mounted so as to be freely rotatable about the hub of a gear wheel 116 provided with teeth 117, that may conveniently, although not necessarily, be of helical type and which in turn is mounted for rotation on a sleeve 115 surrounding the shaft 102, and which sleeve may also be supported by the two spiders 114 and 114a. Power is transmitted from the driven races 111 and 111a to the gear 116 through a system of rollers 119, only one of which is shown in Figure 7, although it will be understood that they are symmetrically disposed about the axis of shaft 102, and which are shown as provided with oppositely directed conical faces engaging inclined walls or grooves 118 provided in the races. The purposes of this construction will be described in detail hereinafter. For the present it is enough to state that if the speed of the races 111 and 111a is the same, the rollers 119 will not rotate about their own axes, but will be carried about the axis of shaft 102 and carry with them the gear wheel 116. Should one of the races rotate faster than the other, the roller will begin to rotate about its own axis by way of compensation, and the gear wheel 116 will rotate at a speed which is the average speed of the two races.

The shaft 102 is provided with an enlargement 103 intended to serve as an abutment for the torque loading system, as will appear later, and it is also provided with an enlargement 104, which may be spherical, and which serves as a seat for the driving race 110 which is provided with an enlarged bore for that purpose and as a result of which it may pivot about the enlargement 104 and slide over the enlargement at the same time. Rotation of the race 110 in relation to the shaft 102 is prevented by the pin 138, engaging a slot provided in the bore of the race 110.

The other driving race, 110a, is driven from the shaft 102 by the spring plate 166, which is of the type known as Belleville spring, carried by a member 161, and being shown as attached thereto by rivets 168, and the rim of plate 166 is provided with slots engaging with lugs 163 carried by the race 110a. The member 161 is provided with a spherical seating surface 159 for the race 110a and is splined internally to engage corresponding grooves in the shaft 102, this construction preventing rotation of the hub relatively to the shaft 102, although permitting sliding thereof along the shaft. A nut 162 is provided on the end of the shaft for adjusting the axial position of member 161 and for holding it in such position.

The purpose of the assembly just described is threefold.

First of all it supports the race 110a with respect to axial pressure so as to permit the pivot member 161 to make adjusting movements without interfering with the correct position of the race 110a. To accomplish this the spherical seat 159 is provided on both the pivot and the cooperating part of the race 110a. The center of curvature of the spherical seat 159 is located within the pivot member 161 and therefore permits a pivotal movement around this center. The pivot member may be out of true axial alignment, because of play in the spline construction and on account of a slight mis-alignment of the nut 162, without interfering with the correct alignment of the race.

Secondly the construction serves to transmit torque between the race 110a and the shaft 102, and thirdly it serves to apply an initial pressure to the entire system of races and rollers, this last function being accomplished by the spring plate 166.

Intermediate the shoulder formed by the enlargement 103 of the shaft 102 and the race 110 is a torque loading system comprising a torque flange 131 and a pressure plate 132, these two members being in contact along the spherical bearing surface 133, and being provided with enlarged bores which permit their lateral and pivotal movement about the shaft 102. Torque balls 135 are interposed between the race 110 and the torque flange 131 and these are positioned in torque grooves, which may be of any suitable type such as the type already described in connection with the construction of Figure 1 and shown in Figure 1B. A ball race 134 is positioned intermediate the pressure plate 132 and the enlargement 103.

The planetary system P comprises the inner or sun member 123, the hub of which is provided with a sleeve-like extension on which are positioned bearings of any suitable type, such as roller or needle bearings 127, for journalling thereon the hub 126 of the outer gear 125 of the planetary system. Thrust members 128 and 129 are provided on the extension of sun gear 123 and these transmit the thrusts of member 126 to shoulders on the shaft 102. Such members are particularly needed where the gears are of the helical type. The intermediate members or pinions 122 of the planetary system are carried on the pins 121 of a carrier 120 on the end of shaft 101, and these pinions mesh with the sun gear indicated as at 130 and also with the outer gear.

A sleeve 136 serves to establish a power connection between the hub 126 of the outer gear 125 of planetary system P and the torque flange 131, and this result may be effected as shown by way of illustration by lugs or extensions 137 on the sleeve 136 that engage openings in the hub 126 and by notches in the sleeve 136 engaged by lugs 138a on the torque flange 131. The lugs or notches of each set are oppositely disposed in relation to shaft 102 and the respective lugs 137 and 138a are positioned on diameters at right angles to each other. This construction which is indicated diagrammatically in Figure 7, may be clearly understood from an inspection of Figure 9, which shows the sleeve 136 in perspective. As a result thereof the sleeve 136 will be capable of universal adjustment without impairment of its power transmitting function.

The sun gear 123 is carried by the shaft 102 in splined relation thereto, as shown at 123a, but is free to slide along the shaft except as restrained by the nut 124 on the shaft 102, which serves to limit its longitudinal movement.

The shaft 145 is shown as journalled at both ends in the casing as shown at 158a and 141a, and for convenience the bearing 141a may be positioned within the sleeve 141 of a removable portion 140 of the casing 165 of the transmission. The sleeve 141 serves as a seat for the bearing 142 on which is journalled a member 143 which carries at one end thereof the internal gear wheel 149 of the planetary system Q, and at its other end the spur gear 144 which meshes with a gear 139 formed on the periphery of the member 126 of planetary system P. Pinions 155, meshing with the outer member 149 of the planetary system Q at 150 and with the inner member or sun gear 148 of the planetary system Q at 154, and carried by pins 152 positioned on a carrier 151 in keyed relation, as shown at 153, to the shaft 145, form the intermediate member of the planetary system Q.

The sun gear 148 is in driving connection with the gear 116 of the toric system through the sleeve 146 to which is keyed at 156, by any suitable means preventing relative rotation and longitudinal displacement, such as a tangential key, the spur gear 160, meshing with the gear wheel 116 at 157. The gear wheel may be journalled in a bearing 164 provided in the casing 165 which serves to give additional support to the sleeve 146 and the parts carried thereby.

It will be understood that any or all of the gears used in my improved construction may be of any desired type, for example, of the helical type. Where the gears 116, 160 are of the helical type, provision against axial thrust has to be made. The wheel 160 is supported as against radial forces practically at its center if the ball bearing 161 is positioned as shown in Figure 7, and this also takes care of the thrust of the helical gears as far as wheel 160 is concerned. Gear wheel 116 will transmit its thrust to either of the races 111 or 111a, thereby increasing the axial pressure upon one of the two toric systems. This increase will, however, ordinarily be less than one per cent of the axial pressure between the races and rolling bodies, for any angles of the helical teeth within practical limits. Its influence upon the toric systems can therefore be practically neglected.

The sun wheel 154 is centered upon the shaft 145 by a sleeve bearing 147. In a properly manufactured planetary gear, there should be no radial force acting upon the sun wheel and therefore no bearing of particular capacity is necessary in this place. Where a helical sun wheel 154 is used, the connection between 146 and 160 must be designed to take care of the axial thrust thereof, and the difference between the axial thrusts of 154 and 160 will then be taken up by the ball bearing 164. An axial thrust equal to the one acting upon sun gear 154 will be exerted upon the ring gear 149 and be transmitted to the drum 143, which also receives the axial thrust of the gear 144, which may also be helical. The difference of the two last named axial forces is taken up by the ball bearing 142 which also centers the wheel 144 against radial forces.

A flange is shown at 158 in the end of shaft 145, which is splined thereto and serves as a convenient way to transmit the power. As shown, it may be positioned intermediate the shaft 145 and the bearing 158a.

It will now be attempted to explain the operation of the device. The races 111 and 111a correspond to 37 of Fig. 4. The carrier 151 of the planetary is connected to the driven shaft 145 similarly to the arrangement of Figure 4. The sun wheel 154 of the planetary Q, as already mentioned, is connected to the races 111 by means of the gears 116 and 160 which are shown as meshing at 157, and the ring gear 149 of the planetary Q is driven through the gears 144 and 126 from the driving shaft 101. The races 111 and 111a turn together with gear wheel 116 as has already been explained, but, because of the differential compensating construction involving the rollers 119 they may rotate at different relative speeds. For purposes of simplifying the following explanation of operation the races 111 and the wheel 116 will be regarded as rigidly connected, so that these three parts rotate as one body, although, as will appear later, such is not strictly the case.

In order to get the same torque load characteristic as in Figure 4, it is necessary to unite the torques of races 110 and 110a and to pass them through the torque loading system 135, 131 associated with race 110, and then to carry the torque to the gear wheel 126, to be transmitted to the gear wheel 144 and the ring gear 149. This is accomplished by my construction.

Race 110a, as already explained, is connected with the shaft 102 by means of the spring disc 166 and the pivot member 161, and the race 110 is connected to the shaft by the driver or pin 138 which engages in a slot thereof so as to permit a certain movement of the race. The torque flange 131, bears against the spherical surface 133 of the pivot plate 132, which transmits the axial pressure through the thrust bearing 134 to the shoulder 103 of the shaft 102. The parts 131 and 132 are thus free to rotate in relation to the shaft, while transmitting axial pressure to the shoulder 103.

It will therefore be seen that the torque of the two races 110 and 110a, which correspond to race 36 of Figure 4, passes through the torque loading device and is delivered after passing through 131, 136, 126, and 144, to the ring gear 149 of the planetary Q, and, to follow out the principle of the construction of Figure 4, the torque from shaft 101 must be divided into two portions, one of which will pass directly into the planetary Q, while the other portion is passed through the torque loading system. For this purpose the shaft 101 is connected to the carrier 120 of planetary P, which is provided with the pins 121, which correspond to the pins 51 of Figure 4, and which carry the pinions 122 that mesh on the outside with the internal gear 125 and on the inside with the sun wheel 130. As a result of this arrangement that part of the torque from 101 which passes through gear 125 and its hub 126 and from there to the gear 144, is directly transmitted to the ring gear 149 of the planetary Q, whereas that part which is transmitted to the inside, that is to the sleeve 123, passes to the shaft 102, and then via the key or driver 138, to the race 110, from which it passes, together with the other torques, to the torque loading system 135, and further, through 131 and 136 to the wheel 126.

If the ratios between the wheels 116 and 160, as well as between the wheels 126 and 144, are one to one, then the conditions for the torque split by the gear system 122—125—130 are the same as in the construction of Figure 4. If, however, ratios different from one to one are employed in either of the two sets of gears 116, 160 and 126, 144, this has to be compensated for in determining the proportion for the torque split in 122, 125, 130.

Figure 8:
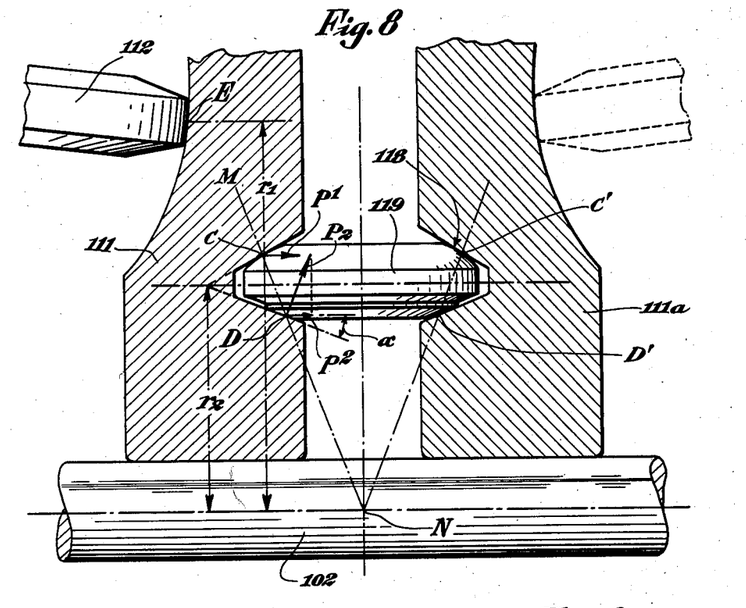
Figure 8 is a detail view, on an enlarged scale of a portion of the construction shown in Figure 7.

On referring to Figure 8 the details of the rollers 119 that are mounted between the races 111 and 111a may be readily understood. As previously explained these rollers engage the races within the grooves 118 of the races and for that purpose the rollers are provided with beveled surfaces that engage the races at points C, C', D, D'.

Taking the first point of contact D as illustrative of the action taking place at all the points of contact, it will be observed that the axial pressure transmitted from the race 11 to the roller 119 at the point D may be denoted by $p_2$ and, if the angle between this component $p_2$ and the contacting surface of the wedge shaped groove race 111 is called alpha, then the pressure $P_2$ perpendicular to the groove surface at D will be greater than $p_2$ in the inverse proportion to the sine of alpha.

The purpose of the wedge formation on the contacting surface of rollers 119 will now be understood. By varying the angle of the conical surface, the pressure at the point of contact can be multiplied to any desired degree and in that manner the adhesive contact pressure at the rollers 119 can be made great enough to transmit a peripheral force greater than that which is transmitted at the point E, between the roller 112 and the race 111. This is necessary for the proper transmission of the torque if the radial distance $r_2$ of the roller 119 is substantially smaller than the radius $r_1$ of the contact point E. The wedge shape construction would be unnecessary if $r_2$ were not smaller than about six-tenths $r_1$, as the difference in the traction coefficients between 112 and 111 on one side and 111 and 119 on the other side will still give a satisfactory result from a practical standpoint. Since, however, the rollers are positioned within the gear 116, and practical considerations require that the diameter of this gear be in the neighborhood of one half the distance between the shafts 102 and 145, which distance must be the minimum possible, it will generally be necessary to position the rollers 119 at a point roughly one-third of the distance $r_2$ from the shaft axis to that position of the point E, or point of contact between the roller and the race, when it is at its maximum distance from the axis of shaft 102. An increased contact pressure at the points C and D is therefore required, approximately in proportion to the ratio $r_2$ to $r_1$. It is further to be observed that the points C and D should preferably be located in a line, such as the line M, N, that will intersect the corresponding line passing through C', D' at the point N located on the axis of shaft 102, that is, at a point that is symmetrical to the races and at the same time positioned on the axis 102.

Figures 9, 10:
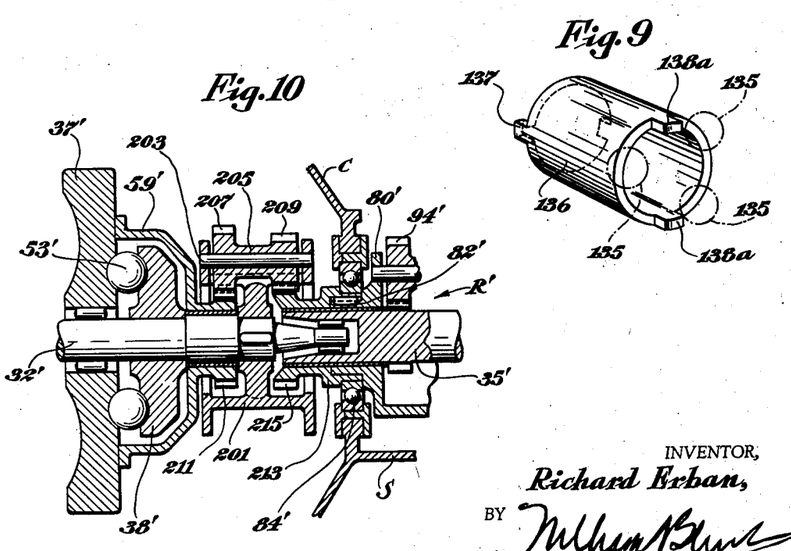
Figure 9 is a perspective view of one of the details of my invention.
Figure 10 is a sectional view showing an external planetary construction such as might be used in connection with the construction of Figure 4.

In Figure 10 is shown an external planetary construction such as might be used in place of that shown in Figure 4. For ease of comparison corresponding parts have been given reference numerals identical with those of Figure 4 except that they have been primed.

The shaft 32', corresponding to the shaft 32 of Figure 4, is shown as carrying keyed thereto the housing 201 that carries journalled therein a set of pins 203, carrying the external planetary gears 205, each provided with two sets of teeth 207 and 209, formed on different pitch diameters.

The member 59' is shown as provided with gear teeth 211' meshing with teeth 207 of the planetary gear 205, and the housing 80' of the reverse gear R' is shown as having, in keyed relation thereto at 82', a sleeve 213 provided with gear teeth 215 meshing with the teeth 209 of the pinion 205.

It will be observed that this construction differs from that of Figure 4 in that the planetary carrier is in driving relation to the shaft 32', instead of with the driven end.

It will be understood that the disclosures herein of the various embodiments of my invention are by way of illustration only and that they are not to be construed in a limiting sense, and that my invention is not to be considered as limited in any other way than as defined in the appended claims.

Having thus described my invention and illustrated its use, what I claim as new and desire to secure by Letters Patent, is:

1. In a power transmission system having a toric driving race and a toric driven race and rollers in adhesive driving contact with said races for transmitting power therebetween, a carrier for said rollers adapted for angular displacement about the axis of the races, a torque loading means associated with said races and adapted to generate an axial pressure to maintain the adhesive driving contact between said races and rollers, said torque loading means comprising a pivotally mounted element, and a member associated with the roller carrier and said pivotally mounted element and adapted to transmit motion from the roller carrier to said element.

2. In a power transmission system having a toric driving race and a toric driven race and rollers in adhesive driving contact with said races for transmitting power therebetween, a carrier for said rollers adapted for angular displacement about the axis of the races, a torque loading device associated with said races and adapted to generate an axial pressure to maintain adhesive driving contact between said races and rollers, said torque loading means comprising a pivotally mounted element and a lever associated with the carrier for the rollers and said pivotally mounted element and adapted to transmit motion from said roller carrier to said element, so as to displace it angularly to an extent different from the angular displacement of said roller carrier.

3. In a power transmission system having a toric driving race and a toric driven race and rollers in adhesive driving contact with said races for transmitting power therebetween, a carrier for said rollers adapted for angular displacement about the axis of the races, a torque loading device associated with said races and adapted to generate an axial pressure to maintain adhesive driving contact between said races and rollers, said torque loading means comprising a pivotally mounted element and a lever associated with the carrier for the rollers and said pivotally mounted element and adapted to transmit motion from said roller carrier to said element, so as to displace it angularly to an extent different from the angular displacement of said roller carrier, the fulcrum of said lever being adjustable for varying the ratio of displacement between the carrier and the element.

4. In a power transmission system of the toric race and roller type, a torque loading device comprising a member adapted for displacement by the resultant of the torques passing through the system, a second member adapted to generate axial pressure when it is displaced, and a pivoted element associated with said two members and adapted to transmit the displacement of one to the other.

5. In a power transmission system of the toric race and roller type, a torque loading device comprising a member adapted for displacement by the resultant of the torques passing through the system, a second member adapted to generate axial pressure when it is displaced, and an element associated with said two members and adapted to transmit the displacement of one to the other in a fixed proportion.

6. In a power transmission system of the toric race and roller type, a torque loading device comprising a member adapted for displacement by the resultant of the torques passing through the system, a second member adapted to generate axial pressure when it is displaced, and a pivoted element associated with said two members and adapted to transmit the displacement of one to the other in a fixed proportion:

7. In a power transmission system of the toric race and roller type, a torque loading device comprising a member adapted for displacement by the resultant of the torques passing through the system, a second member adapted to generate axial pressure when it is displaced, and a pivoted element associated with said two members and adapted to transmit the displacement of one to the other in a fixed ratio, the pivotal point of said element being adjustable so as to vary the said ratio.

8. A power transmission system comprising a driving member and a driven member parallel thereto, one of said members carrying a planetary system and the other of said members carrying a pair of similar toric race and roller systems in parallel relation, planetary means for transmitting power associated with one side of said paired toric systems, a power transmitting member associated with the other side of said paired toric systems, and power transmitting means interposed respectively between one member of said planetary system and one member of said planetary means, and between another member of said planetary system and said power transmitting member.

9. A power transmission system comprising a driving member and a driven member parallel thereto, one of said members carrying a planetary system and the other of said members carrying a pair of similar toric race and roller systems in parallel relation, planetary means for transmitting power associated with one side of said paired toric systems, and a power transmitting member associated with the other side of said paired toric systems, and power transmitting means interposed respectively between the outer member of said planetary system and the outer member of said planetary means, and between the inner member of said planetary system and said power transmitting member.

10. In an infinitely variable transmission system comprising races and rolling bodies in adhesive contact therewith, a torque loading device comprising at least two torque transmitting members angularly movable relatively to each other and provided with cooperating surfaces for generating an axial pressure in proportion to the torque transmitted between them, and means in torque-transmitting engagement with each of the said two members and adapted to by-pass from the said cooperating surfaces a predetermined part of the torque transmitted between the said two torque-transmitting members.

11. An infinitely variable transmission system comprising races and rolling bodies in adhesive contact therewith, a torque loading device comprising at least two torque transmitting members angularly movable relatively to each other for generating an axial pressure between the races and rollers in proportion to the torque transmitted between them, a third torque transmitting member and means operatively connected to this member and to each of the said two members adapted for transmitting a portion of the torque of said third member to one of said two members and the remainder of the torque of said third member to the other of said members.

12. In an adhesive transmission system having cooperating races and rollers, means for generating pressure dependent upon the torques transmitted for insuring adhesive contact between said races and rollers, means for transmitting torques between said system and said pressure generating means, and means movable relatively to both of the above said means and arranged for by-passing a part of the said torques around the said pressure generating means.

13. In a friction transmission system comprising races and cooperating rollers therebetween, means for generating a pressure dependent on the torque transmitted thereby and arranged adjacent to one of said races, means for effecting a division of the torque transmitted between said race and said pressure generating means in a predetermined ratio, and for passing only a portion thereof through said pressure generating means.

14. In a variable transmission system comprising a driving member including a driven member, torque transmitting elements and races and cooperating rollers therebetween, means for generating a pressure dependent upon the torque transmitted thereby for insuring adhesive contact between the said races and rollers, said means being adjacent to one of the said races and in direct driving connection therewith on one side and in driving connection on the other side with another of said elements of the said system, and a mechanism comprising rotatable means in driving connection with one of the above said members and movable relatively to the said pressure generating means, said mechanism forming a differential connection between the said member with which it is connected the said race and the said other element for effecting a division of the torque of the said member between the said race and the said element.

15. In friction transmission system comprising driving and driven members, cooperating races and rollers and torque transmitting elements forming operative connections therebetween, means for generating a pressure dependent upon the torque transmitted between said means and one of the aforesaid elements, means for effecting a division of the torque so transmitted in a predetermined ratio, and for passing only a portion of the total torque of the said element through said pressure generating means.

16. In a variable transmission system in which power is transmitted from a driving member to a driven member, toric races, rollers intermediate said races and in driving adhesive contact therewith for transmitting power therebetween, a self-adjustable pressure member associated with one of said races, a torque loading means intermediate said pressure member and said race, means forming a differentially movable connection between said race and said pressure member comprising an element in torque-transmitting pivotal relationship to said race and said pressure member respectively, and a driving connection carried by said driving member and pivotally engaging said element at a point which forms the fulcrum of a lever of the first class with respect to the two other pivotal connections of said element.

17. In a transmission system in which power is transmitted from a driving member to a driven member, toric races, rollers intermediate said races and in driving adhesive contact therewith races and in driving adhesive contact therewith so that said races rotate in opposite directions with respect to each other, a planetary system comprising three elements differentially rotatable relative to each other, one of said elements being connected to one of the above said members, means for transmitting torque between another of the said elements and those of said races which rotate in one direction, a torque loading device associated with a race which rotates in the opposite direction, means for transmitting torque between the remaining element of the said planetary system and the said torque loading device, and means associated with said torque loading device including a member movable relatively thereto for modifying the pressure generated by said torque loading device.

18. A variable speed power transmission comprising a driving member and a driven member parallel thereto, one of said members carrying a planetary system and the other of said members carrying a toric race and roller system, means for transmitting power between one side of the toric race system and one of the elements of the said planetary system, gear means carried by the above said other member, a torque loading device arranged intermediate said gear means and one of the said toric races, means for transmitting power between said gear means and another of the elements of the said planetary system, and means movable relatively to the said torque-loading device and associated therewith and forming a torque-transmitting path parallel thereto.

19. In a variable transmission, a driving and a driven member, a system of toric races and rollers therebetween and in adhesive driving contact therewith; a planetary system comprising a sun element, a ring element and planetary wheels, intermediate said toric race system and said driven member; a driving connection between the sun element of said planetary system and one side of the toric race system, a driving connection between the said planetary wheels and the said driven member; means forming a driving connection between the other side of the toric race system and the ring element of the planetary system, said means including a pressure generating device comprising elements movable angularly relative to each other for generating adhesive pressure responsive to such angular movement; and means associated with said last named elements and movable relatively thereto for modifying the relative angular movement of the said elements.

20. In a variable transmission system, a driving member, a driven member and an intermediate shaft carrying a toric race and roller system, a planetary system in driving connection with the said driven member and with one side of the said toric race system and with the said intermediate shaft, a pressure generating device associated with said toric race system for generating adhesive pressure, and means forming a driving connection between said driving member and said intermediate shaft and causing relative angular movement therebetween for affecting the said pressure generating device.

21. In a variable transmission system, a driving member, a driven member and an intermediate shaft carrying a toric race and roller system, a planetary system in driving connection with the said driven member and with one side of the said toric race system, a pressure generating device associated with said toric race system for generating adhesive pressure, and means forming a driving connection between said driving member and said intermediate shaft and causing relative angular movement therebetween for affecting the said pressure generating device.

22. An infinitely variable transmission system comprising races and rollers in adhesive contact therewith, a torque-loading device comprising two members angularly movable relatively to each other and adapted to generate axial pressure incidental to such angular movement, means for transmitting torque to said members to cause such angular movement thereof, and a torque transmitting member movable independently of the two above said members and pivotally carrying elements which are in torque-transmitting engagement with each of the above said two members.

23. An infinitely variable transmission system comprising races and rollers in adhesive contact therewith, a torque-loading device comprising two torque-transmitting members angularly movable relatively to each other for generating the adhesive pressure between the said races and rollers, elements in torque transmitting engagement with each of said two members, and a third torque-transmitting member movable independently of the said two members and pivotally connected to the said elements, said pivotal connection being spaced in between the points of torque transmitting engagement of the said elements with the said two members.

24. In a variable speed power transmission mechanism of the toric disc and friction roller type, in combination, coaxial toric discs, friction rollers cooperating therewith and movable angularly to vary the speed ratio of the mechanism, torque-actuated cam mechanism cooperating with the disc and roller assembly to apply tractive pressure thereon, torque-transmitting levers extending between the cam mechanism and the disc and roller assembly and spaced apart around the axis of the discs, shiftable fulcrums for the levers, and a torque member cooperating with the fulcrums for transmission of torque between the torque member and the levers, said fulcrums being shiftable along said levers.

25. In an infinitely variable transmission system, a variable speed unit comprising at least a pair of rotatable races and rolling bodies intermediate said races and in adhesive contact therewith, a torque loading device adapted to produce adhesive pressure between said races and said bodies, and means independent of said unit to deliver a portion of the torque to said unit and the other portion of said torque to said torque loading device.

26. In an infinitely variable transmission system, the combination of a variable speed unit comprising at least a pair of rotatable races and rolling bodies intermediate said races and in adhesive contact therewith, a torque loading device adapted to produce adhesive pressure between said races and said bodies, and means to deliver a portion of said torque directly to said unit and the remaining portion of said torque to said unit through said torque loading device.

27. In an infinitely variable transmission system, the combination of a pair of races and rolling bodies intermediate said races, a torque loading member capable of angular movement with relation to one of said races which is adjacent to said torque loading member, and means adapted to deliver torque directly to said adjacent race and to said angular movable torque loading member.

28. In an infinitely variable transmission system, the combination of a pair of races, rotatable bodies intermediate said races and in adhesive contact therewith, torque loading means adapted to produce adhesive pressure between said races and said rolling bodies, and driving means adapted to deliver a portion of the driving torque directly to one of said races and the remainder of said driving torque to said torque loading device to operate the same.

29. In an infinitely variable transmission system, the combination of a pair of raceway members, rolling bodies in adhesive contact with said raceway members, means to apply torque to one of said raceways, said means comprising a torque loading device adapted to apply a portion of said torque to increase the adhesive pressure between said members and said rolling bodies.

RICHARD ERBAN.